(No Model.)
J. G. HARRIS.
CIDER MILL AND PRESS.
No. 406,347. Patented July 2, 1889.
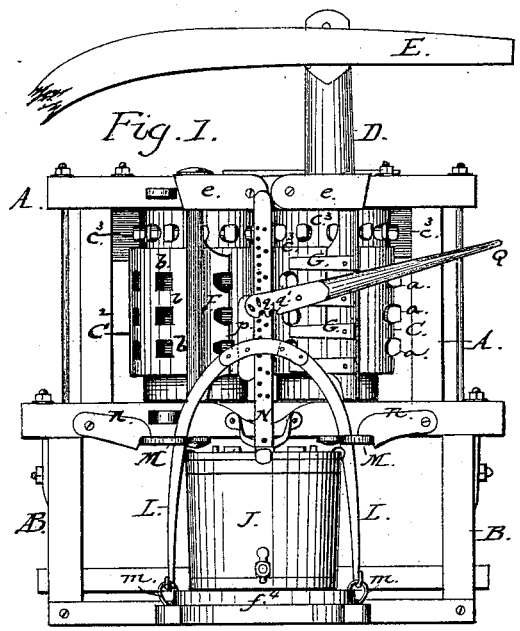
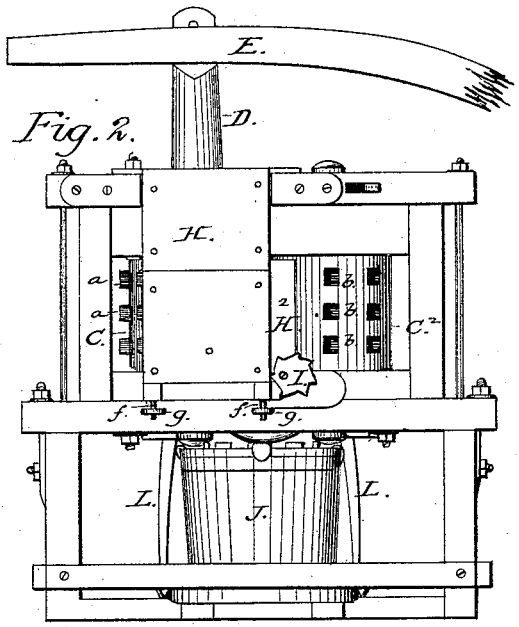
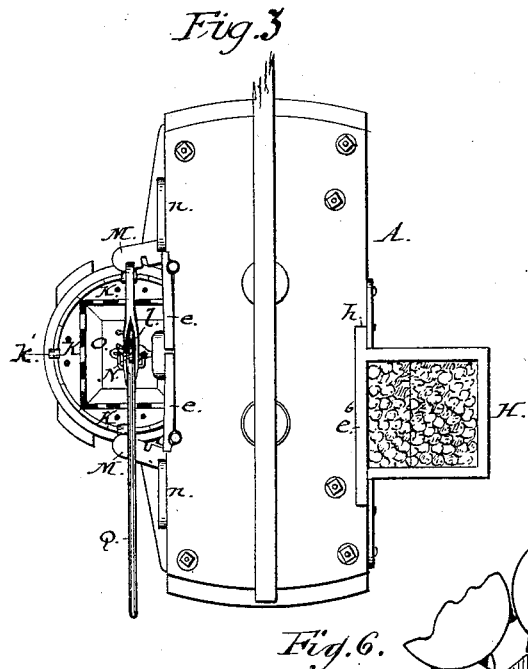
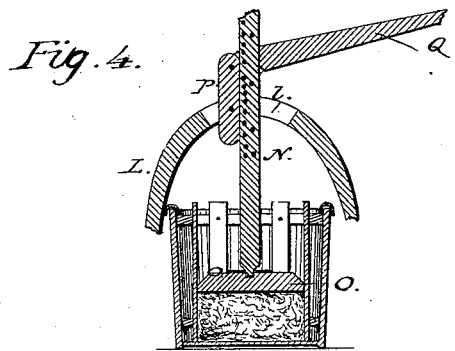
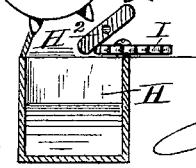
Witnesses:
H. W. Howard
Elmer J. Lund
Inventor:
Joseph G. Harris
per Edw. W. Dount Co.
N. PETERS, Photo-Lithographer, Washington, D. C.

UNITED STATES PATENT OFFICE.

JOSEPH G. HARRIS, OF SEDALIA, MISSOURI.

CIDER MILL AND PRESS.

SPECIFICATION forming part of Letters Patent No. 406,347, dated July 2, 1889.

Application filed July 27, 1888. Serial No. 281,249. (No model.)

*To all whom it may concern:*

Be it known that I, JOSEPH G. HARRIS, a citizen of the United States, residing at Sedalia, in the county of Pettis and State of Missouri, have invented certain new and useful Improvements in Cider Mills and Presses; and I do hereby declare the following to be a full, clear, and exact description of the invention, such as will enable others skilled in the art to which it appertains to make and use the same.

My invention relates to an improvement in devices for grinding or mashing fruit for cider and expressing the juice from the fruit immediately after the process of grinding or mashing.

It consists, generally speaking, first, of a mill elevated upon suitable supports, and, secondly, of a press located in connection with the mill at an elevation lower than said mill. My mill is composed of a pair of rollers or cylinders journaled upon vertical shafts so placed in bearings of a frame that their peripheries shall nearly touch each other. One of said rollers is provided with several series of projecting teeth arranged in vertical lines on its periphery, and the associate roller is provided with indentations into which said teeth take or mesh. Upon the shafts of the rollers are teeth forming spur gear-wheels, one representing the driving and the other the driven gear, and as a result of the action of these gear-wheels the rollers move in opposite directions. One purpose of the teeth and indentations in the said rollers is to assist the gear-wheels to insure coincidence of motion. The fruit is thrown into a hopper or receptacle at one side of the mill-frame, and is drawn in between the rollers by the projecting teeth aforesaid and mashed or ground, and passes thence into a receptacle as pomace, where it is pressed.

The press receptacle consists of a simple half-barrel of strong construction secured to a base fastened to the ground, and within this receptacle is a slat-frame in several sections, which sections are adjustable and fitted to place with their vertical edges abutting two together, forming within the receptacle a complete frame-work. The tub is provided with a suitable spigot through which the cider may be drawn. The pomace is dropped within the slat-frame in the tub, and upon said pomace a platen is placed and brought down forcibly to express the juice from the mash and through the spaces of the slats into the half-barrel.

A metallic bail of strong construction, provided with hooks at its ends and a slot in its crown, is hooked to staples fixed at the base of the tub and extends in the form of an arch centrally over the said tub. The platen is loosely pivoted to a bar pierced transversely with holes, which bar passes through the slot of the said bail. Secured in the said slot of the bail is also a metallic piece pierced with one or more holes used, together with a pin, to form the center of motion for the press-lever. A pin placed at a proper point in the bar rising from the platen serves as the fulcrum to engage the notch or notches of the lever. The bail aforesaid is held to place on either side of the tub or half-barrel by notched holding-catches pivoted to the under side of the mill-floor, and said catches are in turn held in toward the bail by notched pieces pivoted to the face edge of said mill-floor. The feed of the fruit to the mill is regulated by a block vertically pivoted in the mill-frame, and said block is held to adjustment by a wheel of ratchet form pivoted eccentrically to the back edge of the mill-floor.

In the drawings illustrating my invention, Figure 1 is a front elevation of the cider mill and press. Fig. 2 is a rear elevation of the same. Fig. 3 is a plan or top view of the entire apparatus. Fig. 4 is a vertical section of the tub or half-barrel and the slat-frame within the same. Fig. 5 is a detail of the slat-frame. Fig. 6 is a horizontal sectional view showing the relations of the mill-rollers and hopper to the feeding-gate.

Similar reference-letters indicate like parts in all the figures.

Referring to the drawings, A is the frame of the mill, formed of broad horizontal and vertical timbers bolted together and resting upon and bolted to a stand B. The said stand has legs braced by horizontal, longitudinal, and transverse pieces, and the entire structure is secured together by means of screws and screw-bolts, the use of nails being purposely avoided, so that all the parts may be readily separated for cleaning or transportation.

C is a cylinder fixed upon a vertically-movable shaft D, which is journaled in the mill-frame and extends above the same to receive the lever-sweep E.

$C^2$ is a second roller or cylinder, also fixed upon a shaft journaled in the mill-frame and located close to the cylinder C. These two rollers are rabbeted annularly at their bottoms to facilitate the discharge of the pomace into the press-box.

The cylinder C is provided with teeth $a$, which engage corresponding indentations $b$ in the cylinder $C^2$. The purpose of these teeth is to draw the fruit in between the rollers, a coincidence of movement being insured to the two cylinders by reason of the engagement of the teeth $a$ with the indentations $b$.

The cylinders C $C^2$ are provided with radiating teeth $C^3$ at their upper ends, the equivalent of two spur gear-wheels, by which, when the sweep or lever E is moved, the said cylinders are rotated in opposite directions to draw the fruit from the hopper.

Pivoted vertically in the mill-frame, in front of the opposite respective cylinders, are scrapers F G, each provided with fingers extending horizontally and bearing upon the surfaces of said cylinders between the teeth in one instance and the indentations in the other. The purpose of these scrapers is to free the cylinders from the pomace and require it to drop into the press box or tub. The journals of these scrapers are placed in recesses and notches of the mill-frame and are held to place in the latter—their upper bearings by pivoted plates $e$ of wood, which may be lifted to release the scrapers when it is desirable to remove them.

H is the hopper for the fruit, placed on the back of the mill. Said hopper is provided with dowels $f$, which take into staples $g$, fixed in the mill-frame. Secured to the upper part of the hopper, next the mill-frame, is a narrow bar $e^6$, the ends of which slide into grooves $h$ of frame A. By means of the dowels and staples and the bar and groove aforesaid the hopper may be readily fixed in place or removed.

$H^2$ is a gate vertically pivoted in the mill-frame next the fruit-hopper, and is adjustable about its axis to open to any suitable degree the passage-way to the grinding or mashing surfaces of the rollers.

I is the wheel, of ratchet form, pivoted to the mill-frame outside the hopper. The notches formed by the teeth of this wheel engage the outer exposed angle of said gate to hold it to suitable adjustment, and thus regulate the feed. The said wheel I is so pivoted that with reference to the gate it has the effect of an eccentric.

J is the box or tub for the press, which sets upon a disk $f^4$, anchored in some suitable manner to the ground. The tub may be the half of a strongly-constructed barrel provided with a spigot through which the cider may be drawn. The press-frame is composed of several parts (four preferred) K, formed each of two perforated pieces $g^4$, connected together by slats $g^5$. This frame may be dropped into the half-barrel with any two of the sections touching each other and forming vertical joints. Each of said sections K is provided at its top with a flat hook $k'$, which rests upon the upper edge of the said half-barrel and supports the section.

L is the bail, hooked to staples $m$ and provided with a slot $l$.

M M are wooden catches pivoted to the mill-frame and provided with notches, which engage the bail on either side and hold it upright.

$n$ $n$ are pivoted notched latches, which hold the catches $m$ locked against the bail. N is a perforated bar, which passes through the slot of the bail and bears upon a platen O, which rests upon the pomace in the tub.

$p$ is a post secured in the slot of the bail L and to which is pivoted the press-lever Q.

The press-lever Q is provided with holes in its larger end by which it may be pivoted to the post $p$, and with notches $q$ $q'$, which are intended to engage a pin provided for the holes in the bar N. By means of said holes and notches in the press-lever and the pins in the post $p$ and bar N the lever may be shifted at its fulcrum end to increase or reduce its power.

The fruit is thrown into the hopper at the back of the mill, and while the cylinders of the mill are rotating the said fruit is drawn in by the teeth $a$ and mashed as it passes between the closely-adjacent surfaces. Reaching the front of the mill, the scrapers as they clear the cylinders shunt the pomace into the press box or tub. When a sufficient quantity of pomace drops to place, the platen O is placed upon it, and the bail is adjusted to place thereon and the post for the lever is placed upon it. The press-lever is now adjusted and brought down with sufficient power to express the juice from the fruit, which passes through the crevices of the slats of the press-frame and is drawn off through the spigot fixed in the tub. The frame in the tub, being composed of several pieces, is readily removed when it becomes necessary to clean the press. The bail with the post and lever may be readily unlocked and turned down over the tub out of the way, and the platen lifted by its bail when the mill is in operation mashing the fruit.

Having thus described my invention, what I claim as new, and desire to secure by Letters Patent, is—

1. A frame for a cider-press, composed of several independent sections formed of slats and cleats to hold them together and provided with a hook $k'$, in combination with a tub which, when the several sections are in place, holds them together, as and for the purpose set forth.

2. The combination, with the press-bail hooked to the base of the press, provided with a slot in its crown, and a post $p$, secured in said slot, of the press-lever pivoted to said post $p$, the upright perforated bar provided with a pin for a fulcrum, the platen for the pomace, and the base of the press provided with staples for the bail, as and for the purpose specified.

3. The combination, with the mill-frame, the bail for the press, and bar N, of catches M and $n$ and the base for the tub provided with staples, as and for the purpose set forth.

4. The combination, with the mill having vertically-arranged cylinders geared together with meshing gear-wheels and provided with feed-teeth on the one and indentations on the other, the lever-sweep fixed upon the shaft of one of said cylinders, the feeding-gate, and scrapers, substantially as described, of the press consisting of a frame formed as described and fitting in a half-barrel, as described, the upright perforated bar N, provided with fulcrum-pins, the press-lever provided with notches and pivoted in post $p$, the bail L, provided with hooks on its ends and a slot in its crown, the platen O, and the base for the half-barrel provided with staples to receive the hooks of the bail, all arranged substantially as and for the purpose set forth.

In testimony whereof I affix my signature in presence of two witnesses.

JOSEPH G. HARRIS.

Witnesses:
WILLIAM BECK,
SAMUEL ARCHER.